United States Patent
Tiirola et al.

(10) Patent No.: US 12,095,697 B2
(45) Date of Patent: Sep. 17, 2024

(54) PDCCH STRUCTURE FOR COVERAGE LIMITED SCENARIOS

(71) Applicant: Nokia Technologies Oy, Espoo (FI)

(72) Inventors: Esa Tiirola, Oulu (FI); Kari Hooli, Oulu (FI); Kari Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 424 days.

(21) Appl. No.: 17/603,519

(22) PCT Filed: May 11, 2020

(86) PCT No.: PCT/IB2020/054441
§ 371 (c)(1),
(2) Date: Oct. 13, 2021

(87) PCT Pub. No.: WO2020/234687
PCT Pub. Date: Nov. 26, 2020

(65) Prior Publication Data
US 2022/0190989 A1    Jun. 16, 2022

Related U.S. Application Data (60) Provisional application No. 62/849,772, filed on May 17, 2019.

(51) Int. Cl.
H04L 5/00          (2006.01)
(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

2020/0037248 A1* 1/2020 Zhou ................ H04L 5/0048
2020/0067676 A1* 2/2020 Yi .................... H04W 72/0446
2020/0389874 A1* 12/2020 Lin .................. H04L 5/0053

FOREIGN PATENT DOCUMENTS

CN      109565390 A    4/2019

OTHER PUBLICATIONS

"3rd Generation Partnership Project; Technical Specification Group Radio Access Network; NR; Physical channels and modulation (Release 15)", 3GPP TS 38.211, V15.5.0, Mar. 2019, pp. 1-96.
"New SID on NR waveform beyond 52.6GHz", 3GPP TSG RAN Meeting #79, RP-180453, Agenda: 9.1.2, Qualcomm, Mar. 19-22, 2019, 4 pages.
"New SID: Study on NR design above 52.6GHz", 3GPP TSG RAN Meeting #79, RP-180320, Agenda: 9.1.2, Intel Corporation, Mar. 19-22, 2018, 4 pages.

(Continued)

*Primary Examiner* — Minh Trang T Nguyen
(74) *Attorney, Agent, or Firm* — Barta Jones, PLLC (57) ABSTRACT

According to a first embodiment, a method may include receiving, by a user equipment, a first physical downlink control channel (PDCCH) configuration from a network entity. The method may further include detecting, by the user equipment, at least one PDCCH based on the first PDCCH configuration. The method may further include transmitting and/or receiving, by the user equipment, at least one signal based on the at least one detected PDCCH.

8 Claims, 9 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.
International Search Report and Written Opinion received for corresponding Patent Cooperation Treaty Application No. PCT/IB2020/054441, dated Jul. 13, 2020, 11 pages.
"On the PDCCH control resource set and its connection to the search space for NR", 3GPP TSG RAN WG1 #90, R1-1714059, Agenda: 6.1.3.1.2.1, Nokia, Aug. 21-25, 2017, 5 pages.
"Remaining issues on control resource set and search space", 3GPP TSG RAN WG1 Meeting #93, R1-1807353, Agenda: 7.1.3.1.2, Qualcomm Incorporated, May 21-25, 2018, 11 pages.
Office Action received for corresponding Chinese Patent Application No. 202080036515.0, dated Jun. 25, 2024, 8 pages of Office Action and no page of translation available.

\* cited by examiner

PDCCH STRUCTURE FOR COVERAGE LIMITED SCENARIOS

RELATED APPLICATION

This application claims priority to PCT Application No. PCT/IB2020/054441, filed on May 11, 2020, which claims priority to U.S. Application No. 62/849,772, filed on May 17, 2019, each of which is incorporated herein by reference in its entirety.

BACKGROUND

Field

Various communication systems may benefit from improved PDCCH coverage.

Description of the Related Art

3rd Generation Partnership Project (3GPP) new radio (NR) Release (Rel)-15 describes operations associated with frequencies of up to 52.6 GHz. While fifth generation (5G) Rel-15 physical channels were designed and optimized for scenarios under 52.6 GHz, higher frequencies are associated with very large spectrum allocations, and may support additional high-capacity applications. 3GPP RAN considers 5G NR beyond 52.6 GHz spectrum ranges, use cases, and deployment scenarios and requirements, which may be available in future releases. Furthermore, spectrum options for NR beyond 52.6 GHz may include potentially high mm-wave bands for 5G and beyond, such as 70/80/92-114 GHz.

3GPP RP-180453 and RP-180320 are considering NR beyond 52.6 GHz, specifically regarding waveform design for operations above 52.6 GHz, as well as physical layer designs for operations above 52.3 GHz. Such designs may have various objectives, such as efficient transceiver design providing power efficiency and simplicity. In addition, improvements in coverage to support operations in conditions with a high propagation loss may be considered, as well as continuing support for physical layer channel designs for below 52.6 GHz from NR Rel-15 when needed.

BRIEF DESCRIPTION OF THE DRAWINGS

For proper understanding of this disclosure, reference should be made to the accompanying drawings, wherein.

DETAILED DESCRIPTION

Systems above 52.6 GHz may need to be configured to handle increased path loss, larger antenna arrays, and less efficient radio frequency components, for example, power amplifiers. Thus, systems above 52.6 GHz may be more noise limited, such as at a cell edge, requiring more power from power amplifiers. Single carrier (SC) waveforms are preferable over OFDM due to their low PAPR properties. The lower PAPR waveforms may enable a power amplifier to run at a higher power in order to maintain coverage. However, similar to Rel-15 UL, the CP-OFDM modulation may still be beneficial for non-power limited UE, such as due to higher spectral efficiency with higher modulation coding scheme (MCS) and/or multiple input multiple output (MIMO) order for the same receiver complexity.

PA efficiency may also be a factor in downlink transmissions due to large antenna arrays and/or limitation in component technology. Thus, the SC-based waveforms may be standardized for downlink transmissions in order to maximize coverage and power amplifier efficiency, while continuing to support legacy OFDM for high throughput for UE in favorable radio propagation conditions. For example, larger antenna arrays may provide higher beamforming gains, which may be achieved through higher order analog beamforming.

NR provides support for multiple numerologies. For example, table 1 in 3GPP technical specification (TS) 38.211 below describes transmission numerologies supported by NR.

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

These larger subcarrier spacings (□f) may provide larger carrier bandwidths for a given fast fourier transform (FFT) size (such as FFT size of 4096 or 8192), as well as smaller symbol durations, and, potentially, lower latency. These transmission numerologies may also provide smaller channel access overhead due to finer-granularity of frame design. There may also be a reduced sensitivity to phase noise, and/or reduced cyclic prefix.

NR Rel-15 also support bandwidth parts (BWP) of 275 physical resource blocks (PRBs). As a result, the maximum BWP size according to NR Rel-15 is 792 MHz (0.24 MHz*12*275), which is insufficient for scenarios above 52.6 GHz where channel bandwidth may be as high as 10 GHz. Furthermore, there may be additional phase noise. Larger subcarrier spacing may be used to limit phase noise and provide a larger carrier bandwidth with a reasonable FFT size. For example, this may be provided by extending the numerology scaling framework defined in NR Rel-15 to support additional values for $\mu$, such as those shown in FIG. 1, which may include $2^\mu$ scaling of subcarrier spacing, IFFT/FFT block length $2^\mu$, and clock rate $2^\mu$ related to LTE.

3GPP TS 38.300 describes PDCCH operation in NR licensed band operation. In particular, the PDCCH may be used to schedule DL transmissions on PDSCH and UL transmissions on PUSCH. PDCCH may also be used for other purposes, such as BWP switching or conveying power control commands for multiple UEs at the same time. The DCI on PDCCH may include downlink assignments containing at least MCS format, resource allocation, and hybrid-ARQ information related to DL-SCH, and furthermore, may include uplink scheduling grants containing at least MCS format, resource allocation, and hybrid-ARQ information related to UL-SCH. A UE may monitor a set of PDCCH candidates in the configured monitoring occasions in at least one configured control resource (CORESET) according to the corresponding search space configurations. A CORESET may consist of a set of PRBs with a time duration of 1 to 3 OFDM symbols. The resource units may be defined as resource element groups (REGs) or REG bundles, and control channel elements (CCEs) may be defined within a CORESET with each CCE consisting a set of REG bundles and REGs.

Under 3GPP R-15, a resource element group may comprise at least one resource element, which may refer to at least one subcarrier during one symbol, for example, an orthogonal frequency division multiplexing (OFDM) symbol or a single carrier frequency division frequency (SC-FDMA) symbol. Each REG may contain 12 adjacent subcarriers, equivalent to one physical resource block (PRB). In addition, multiple adjacent REGs in frequency and/or time may be grouped together to form a REG bundle. Some functionalities of the PDCCH, such as interleaved resource mapping and precoder cycling granularity may be determined based on at least one REG bundle. For example, a UE may assume that a base station utilizes the same beamforming weights for all REGs/REs of a REG bundle.

Figure 1:
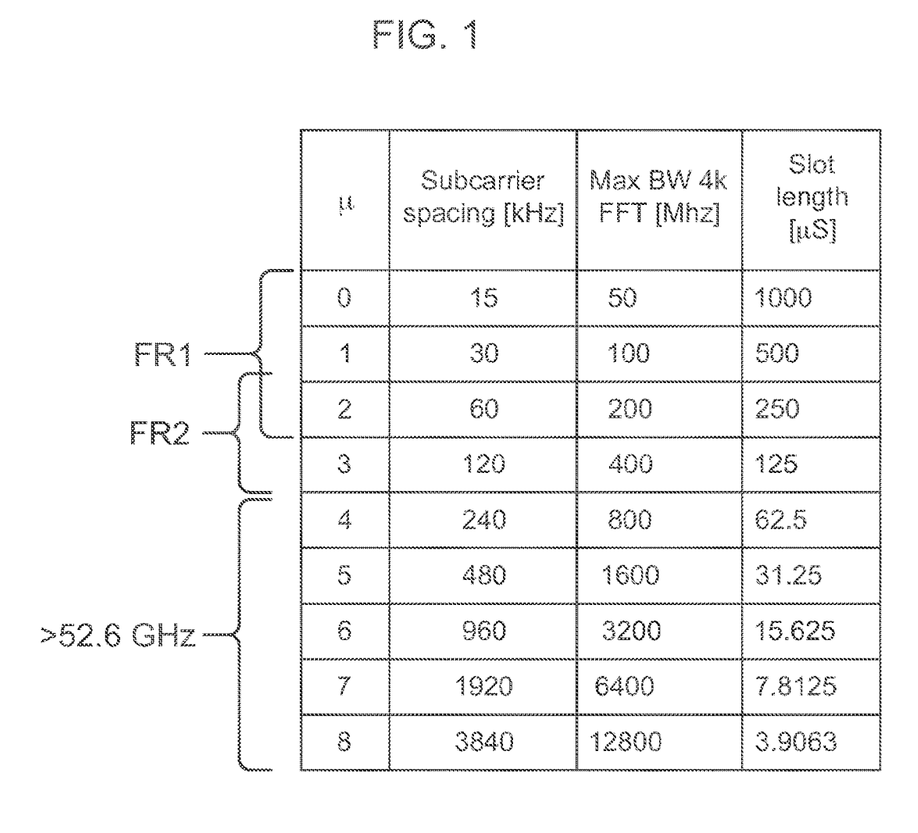
FIG. 1 illustrates numerology candidates for above 52.6 GHz scenarios.

However, link budget decreases by 3 dB when the subcarrier spacing doubles since the symbol and slot duration scales down when SCS increases, as illustrated in FIG. 1. Furthermore, achievable transmission power does not increase when the subcarrier spacing is increased. It would be desirable to reuse the same sites for different mmWave radios. However, the link budget difference between SCS 120 kHz (a typical SCS for FR2) and 960 kHz (a candidate SCS for above 52.6 GHz) may be as high as 9 dB (10*log 10(960/120)). Thus, it would be desirable to support smooth coverage extension for PDCCH when operating above 52.6 GHz scenarios.

Figure 2:
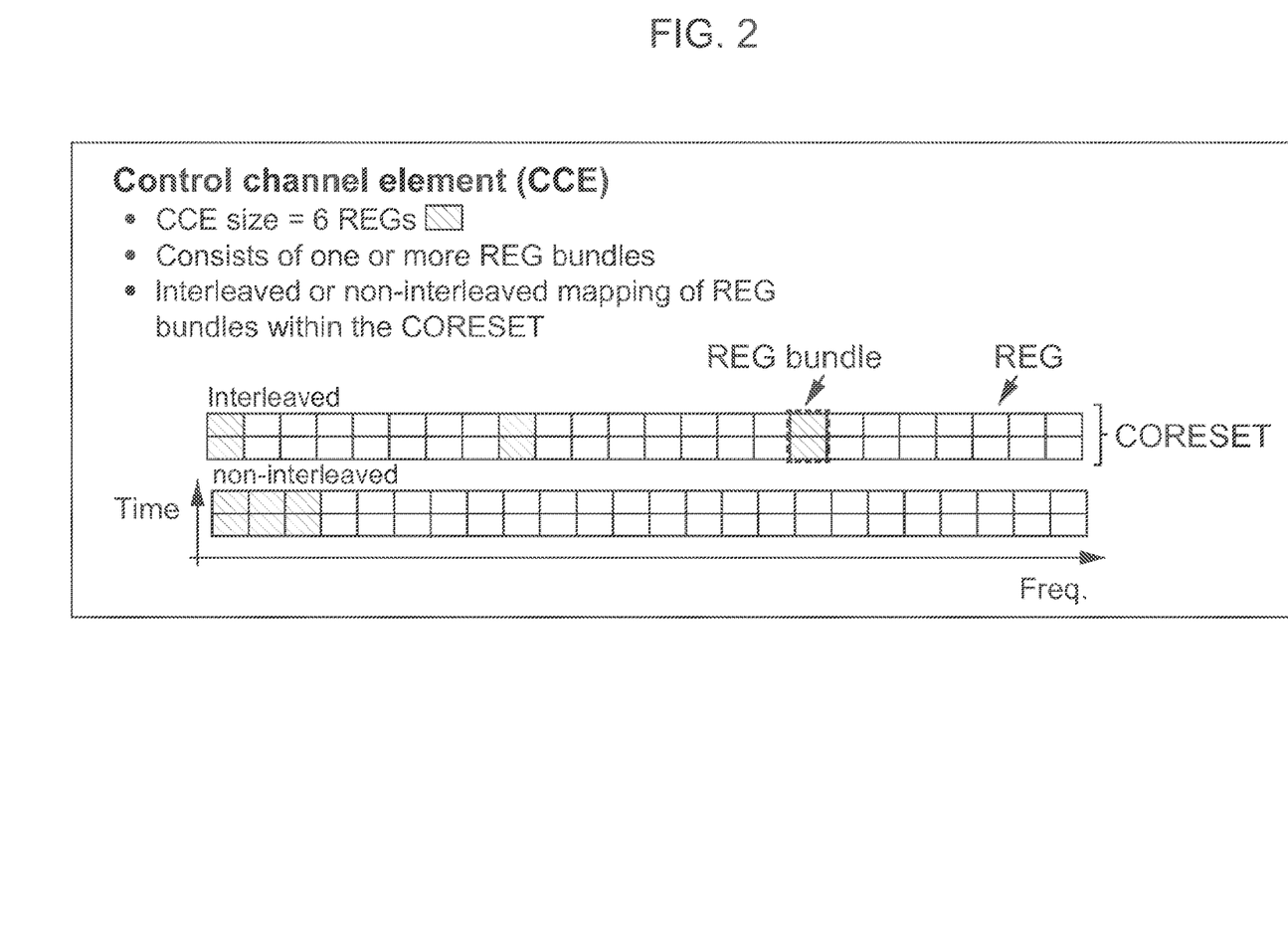
FIG. 2 illustrates an interleaved and non-interleaved CCE-to-REG mapping.

3GPP Rel-15 PDCCH discusses OFDM-based PDCCH design, where different code rates for the control channels may be realized by aggregating different numbers of CCE. However, as shown in FIG. 2, each REG bundle, as a building block of CCE, already covers the entire CORESET in time domain. Thus, aggregating a different number of CCEs within the CORESET does not improve the link budget since CCE aggregation does not increase the transmission time spent for PDCCH. In addition, CCE aggregation under Rel-15 may increase processing gain, yet the bandwidth of thermal noise may increase as well, providing an improvement in interference rather than any thermal noise. Furthermore, NR R15 PDCCH multiplexing solution may not be appropriate for mmWave scenarios since there is only limited need for DCI multiplexing within a narrow beam.

Certain embodiments described herein may have various benefits and/or advantages to overcome the disadvantages described above. For example, certain embodiments may provide gains in processing gain due to an extended transmission time interval, as well as reductions in thermal noise and improvements in link budget, such as in thermal noise-limited scenarios. Furthermore, various embodiments support single carrier waveforms facilitating a higher power amplifier (PA) output power. Some embodiments may also support variable aggregation levels and DMRS densities, variable numbers of parallel CORESETs, and/or variable switching opportunities. Control channels may be formed by aggregation of CCE. Different code rates for the control channels may be realized by aggregating different number of CCE. Polar coding may be used for PDCCH, and each CCE carrying PDCCH may carry its own DMRS. QPSK modulation may be used for PDCCH.

Figure 4:
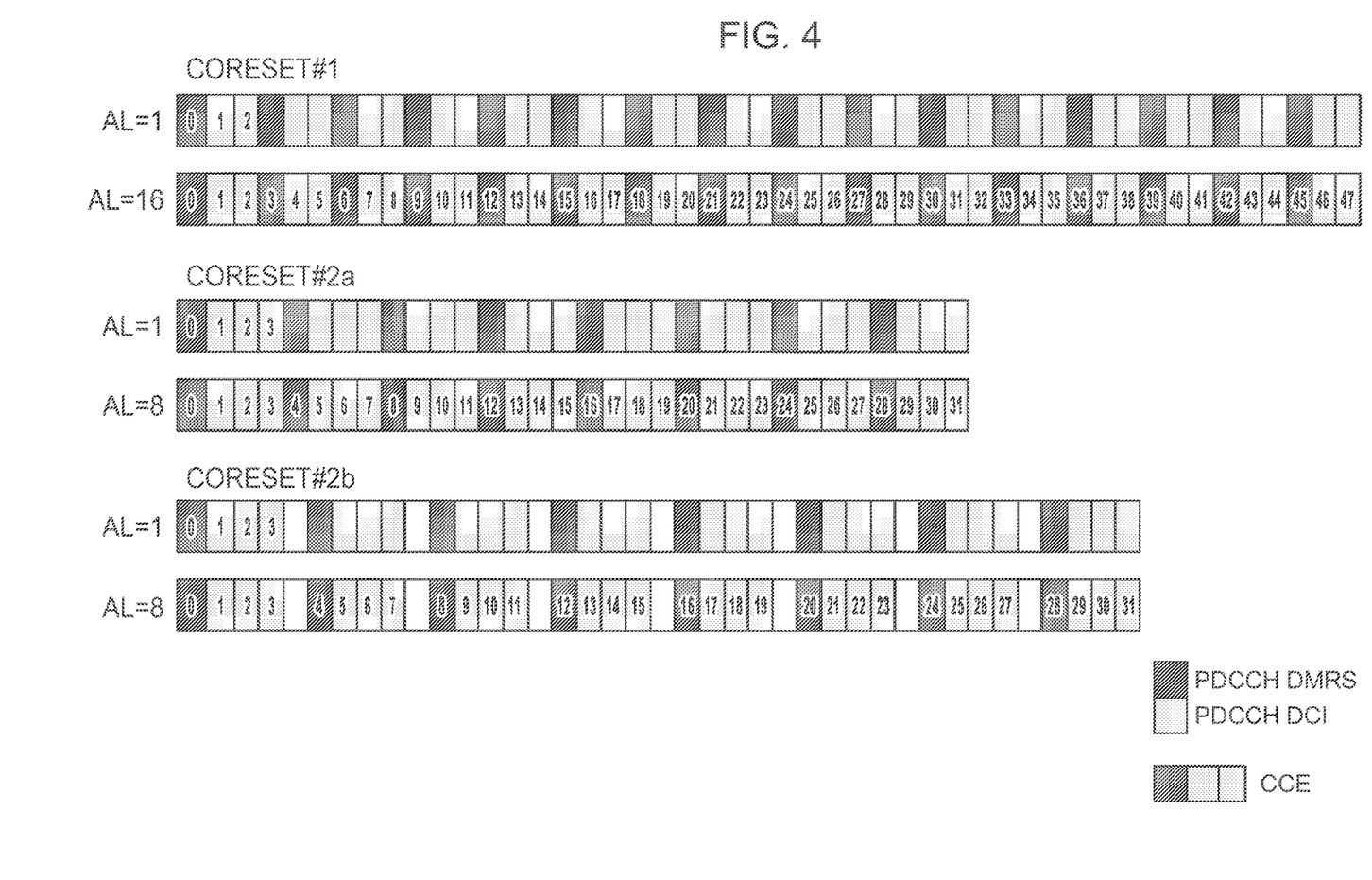
FIG. 4 illustrates an example of two CORESETs according to certain embodiments.

FIG. 4 illustrates an example of two CORESETs according to certain embodiments, where the use of multiple CORESETs may provide optimization of beam switching gaps separately in various scenarios. As illustrated in FIG. 4, CORESET #1 may be used for serving cell edge UEs, eliminating the need for beam switching gaps between consecutive CCEs since each cell edge UE occupies the entire CORESET. In this manner, if beam switching is desired for PDCCHs with an AL of 1, one CCE between PDCCHs may remain unused for beam switching. Furthermore, in contrast to CORESET #2a, CORESET #2b may support beam switching gaps after each CCE, where the ratio of DMRS densities in CORESET #1 and CORESET #2a may be 1:3 and 1:4, respectively. Alternatively, at least one transmission gap configured for beam switching may be included in the last discrete Fourier transform spread orthogonal frequency-division multiplexing (DFT-S-OFDM) symbol of each CCE. Various embodiments may also reduce the complexity of the PDCCH subsystem, such as by the absence of a FDM component. Thus, certain embodiments are directed to improvements in computer-related technology.

Figure 3:
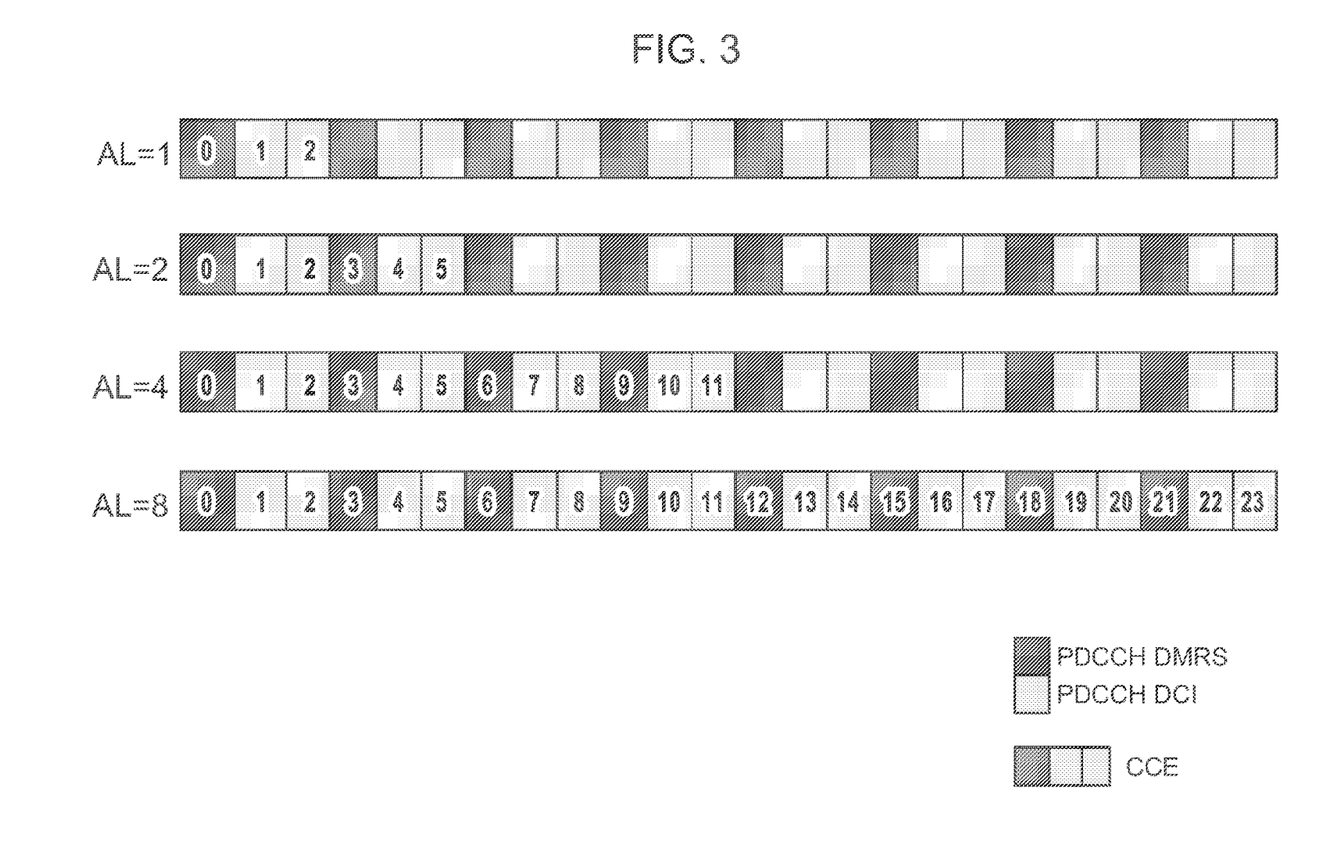
FIG. 3 illustrates an example of a PDCCH structure according to certain embodiments.
Figure 5:
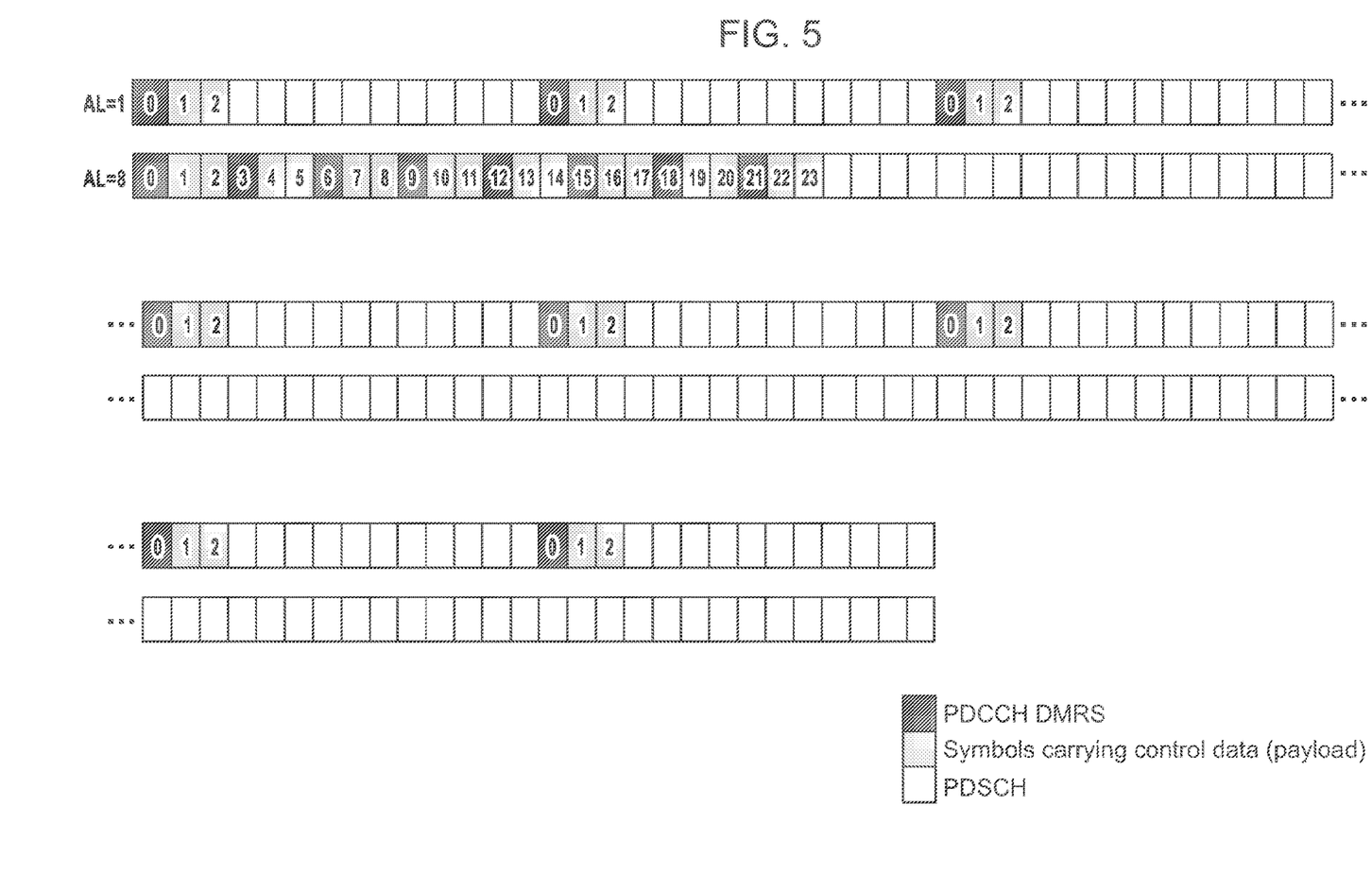
FIG. 5 illustrates an example of distributing CCEs of the CORESET in time according to certain embodiments.
Figure 6:
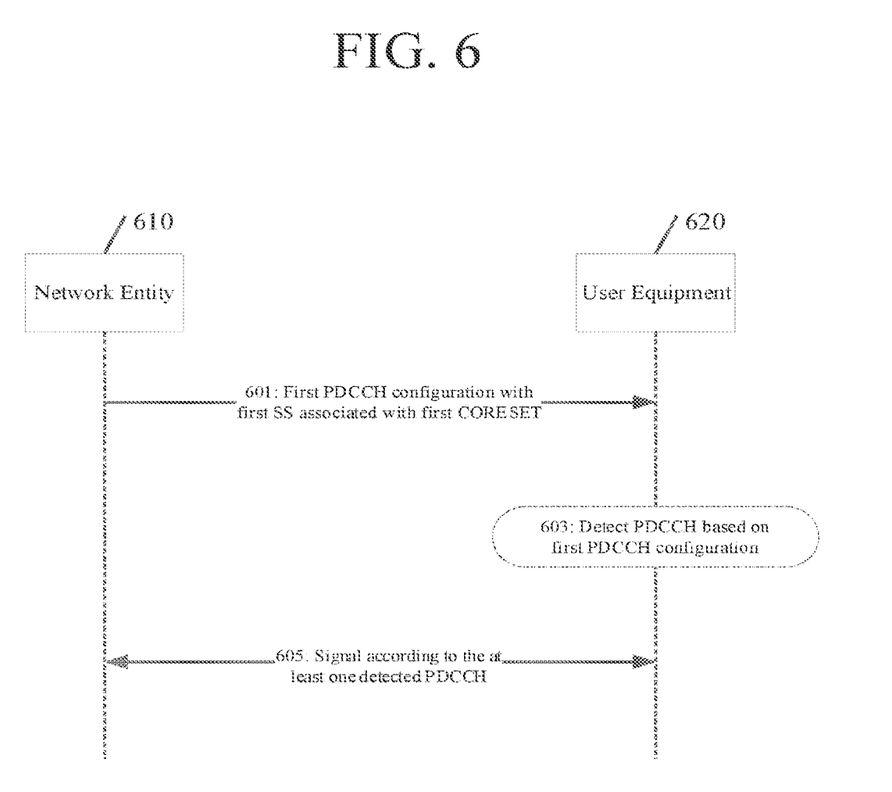
FIG. 6 illustrates an example of a signaling diagram according to certain embodiments.

FIG. 6 illustrates an example of a signaling diagram showing communications between network entity 610 and user equipment 620. Network entity 610 may be similar to network entity 910, and user equipment 620 may be similar to user equipment 920, both illustrated in FIG. 9. Certain embodiments described herein propose a framework for single carrier-based PDCCH according to a CORESET structure, such as the structure illustrated in FIG. 3. Such as structure may enable a UE to perform PDCCH-blind detection corresponding with various aggregation level in the time domain. Different scheduling schemes may cause PDCCH candidates corresponding with CCEs associated with a low aggregation level to be configured within CCEs of a high aggregation level, such as illustrated in FIGS. 3 and 4. Alternatively, CCEs of the CORESET may be distributed with a low aggregation in time domain, such as shown in FIG. 5.

For example, in step 601, NE 610 may transmit a first physical downlink control channel (PDCCH) configuration to UE 620. The first PDCCH configuration may comprise a first search space (SS) associated with a first control resource set (CORESET), and the first SS may comprise at least one PDCCH candidate. In this context, search space may also be referred to as search space set or other similar language. A set of PDCCH candidates for UE 620 to monitor on a CORESET may be defined in terms of a PDCCH search space. In various embodiments, UE 620 may also receive a second PDCCH configuration having a search space associated with a second CORESET from NE 610. The second PDCCH configuration may comprise a second SS associated with a second CORESET, and the second SS may comprise at least one second PDCCH candidate.

In some embodiments, the first SS may comprise at least one PDCCH candidate, where each of the at least one PDCCH candidate may comprise at least one control channel element (CCE) including at least one of at least one demodulation reference signal (DMRS) portion, or at least one downlink control information (DCI) portion. In certain embodiments, a CCE may comprise one or more REGs as building blocks, such as DMRS REG(s) and DCI REG(s). In addition, a CCE may comprise one or more REG bundles, for example, a CCE may correspond to an REG bundle.

As an example, at least one CCE in the first CORESET may be associated with a first DMRS density, and at least one CCE in the second CORESET may be associated with a second DMRS density, where the first and the second DMRS densities may be different or the same. In various embodiments, at least one PDCCH candidate of UE 620 may vary between consecutive monitoring occasions based upon at least one predefined hashing function. For example, hashing may be applied to mitigate inter-user blocking probability by randomizing the allocation of PDCCH candidates of a user within the CORESET over consecutive time slots.

In various embodiments, the first PDCCH configuration may include a first set of aggregation levels, and the second PDCCH configuration may include a second set of aggregation levels which may be different from the first set of aggregation levels. For example, one of the at least one PDCCH candidate and one of the at least one second PDCCH candidate with the same aggregation level of the same CORESET may be non-overlapping in time domain. Additionally or alternatively, one of the at least one PDCCH candidate may overlap at least partially in time domain with one of the at least one second PDCCH candidate with different aggregation levels of the same CORESET. Furthermore, at least one of the first PDCCH configuration or the second PDCCH configuration may be related to a single carrier waveform.

In several embodiments, the first CORESET and the second CORESET may fully overlap in frequency domain, partially overlap in frequency domain, or not overlap in frequency domain. Additionally or alternatively, at least one predefined time resource of the first or second CORESETs may be reserved for beam switching. Furthermore, at least one predefined time resource of the first or second CORESETs may be reserved between CCEs, at least one predefined time resource of the first or second CORESETs may reserve at least one CCE, or at least one or each CCE may cover at least one or all frequency domain resource elements of the associated CORESET. UE 620 may be configured to interpret precoder granularity as at least one CCE.

In step 603, UE 620 may detect at least one PDCCH according to the first PDCCH configuration. UE 620 may also detect at least one second PDCCH according to the received second PDCCH configuration. UE 620 may be configured with at least one search space mapped to at least one CORESET, and may monitor for PDCCH associated with different PDCCH aggregation levels only in the time domain. For example, each CCE may cover an entire frequency allocation of the associated CORESET, with an absence of FDM between multiple CCE within a single CORESET.

In various embodiments, FDM may be configured with multiple CORESETs, such as where NE 610 supports at least two digital transceiver units, with each transceiver being configured with a separate CORESET. As a result, the DMRS density may be optimized by be separated for various AL, as illustrated in FIG. 4. DMRS density may be described by a ratio of DMRS symbols to symbols including both DMRS symbols and DCI symbols. DMRS density may be high, e.g. 1:2, meaning that there is as many DMRS symbols as there is DCI symbols. DMRS density may also be lower, e.g. 1:3, 1:4, or 1:5, resulting in lower overhead due to DMRS. As an example, the first CORESET (CORESET #1) with a first DMRS density may be configured for use for serving at least one cell edge UE (AL=16). The first DMRS density may be high, e.g. 1:2 or 1:3 as shown in FIG. 4. In this case, a higher DMRS density in time domain may result in defining a CCE shorter than the CCE associated with the second CORESET and reduced PDCCH overhead (CORESET #2a, CORESET #2b). Another embodiment may include an equal number of PDCCH DCI symbols within each CCE, such as 3, and vary the number of DMRS symbols per CCE, such as between 1, 2, 3. The first CORESET may be used also for UEs with small AL (e.g. 1), such as for UE associated with propagation conditions exceeding a predefined threshold or based on at least one other selection metric defined by NE 610. A small number of DCI symbols may be enough for such UEs (e.g., due to use of relatively high code rate in the encoding of DCI bits). As a DMRS symbol may occupy a full symbol and only a small number of DCI symbols may be needed, the PDCCH candidate may have a high DMRS density as shown in FIG. 4 for CORESET #1 with AL=1 The second CORESET may be configured for serving UE with propagation conditions exceeding a second predefined threshold or based on at least one other selection metric defined by NE 610, for example, PDCCHs with aggregation level of 1, 2, 4, 8, or other values. The second CORESET may have a second DMRS density that may be lower than the first DMRS density, e.g. 1:4 (as for CORESET #2a and #2b) or 1:5.

In step 605, UE 620 may transmit and/or receive at least one signal according to the at least one detected first and/or second PDCCH.

Figure 7:
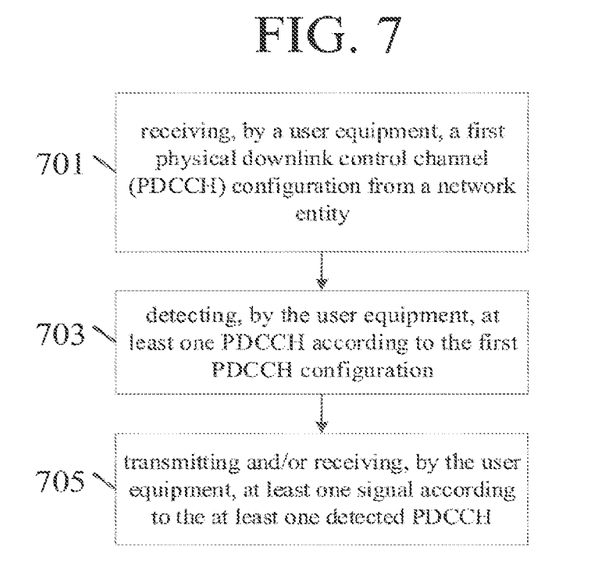
FIG. 7 illustrates an example of another method performed by a user equipment according to certain embodiments.
Figure 9:
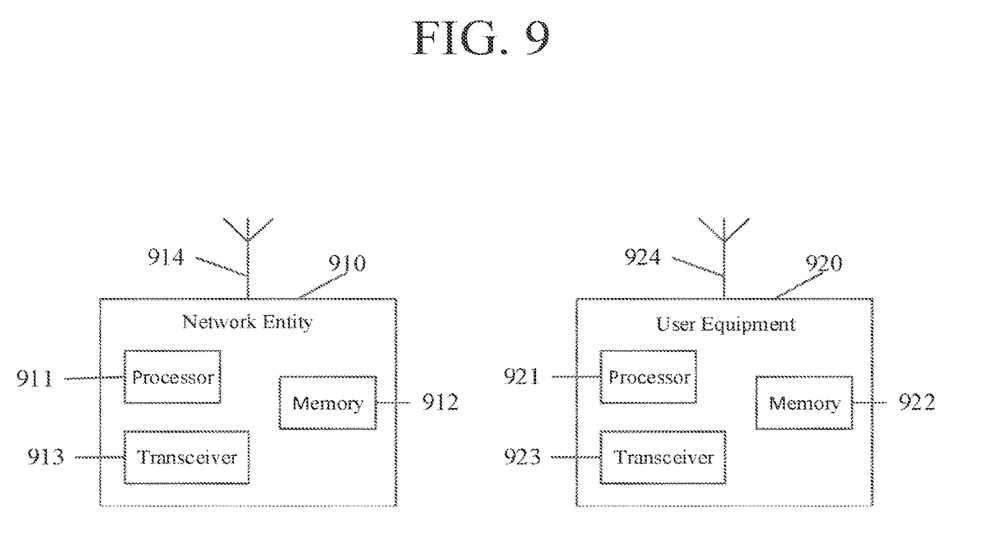
FIG. 9 illustrates an example of a system architecture according to certain embodiments.

FIG. 7 illustrates an example of a method performed by a user equipment, such as user equipment 920 illustrated in FIG. 9, according to certain embodiments. In step 701, the UE may receive a first physical downlink control channel (PDCCH) configuration from a network entity, such as NE 910 illustrated in FIG. 9. The first PDCCH configuration may comprise a first search space (SS) associated with a first control resource set (CORESET), and the first SS may comprise at least one PDCCH candidate. In this context, search space may also be referred to as search space set or other similar language. A set of PDCCH candidates for the UE to monitor on a CORESET may be defined in terms of a PDCCH search space. In various embodiments, the UE may also receive a second PDCCH configuration having a search space associated with a second CORESET from the NE. Additionally, the UE may detect at least one second PDCCH according to the received second PDCCH configuration. The second PDCCH configuration may comprise a second SS associated with a second CORESET, and the second SS may comprise at least one second PDCCH candidate.

In some embodiments, the first SS may comprise at least one PDCCH candidate, where each of the at least one PDCCH candidate may comprise at least one control channel element (CCE) including at least one of at least one demodulation reference signal (DMRS) portion, or at least one downlink control information (DCI) portion. In certain embodiments, a CCE may comprise one or more REGs as building blocks, such as DMRS REG(s) and DCI REG(s). In addition, a CCE may comprise one or more REG bundles, for example, a CCE may correspond to an REG bundle.

As an example, at least one CCE in the first CORESET may be associated with a first DMRS density, and at least one CCE in the second CORESET may be associated with a second DMRS density, where the first and the second DMRS densities may be different or the same. In various embodiments, at least one PDCCH candidate of the UE may vary between consecutive monitoring occasions based upon at least one predefined hashing function. For example, hashing may be applied to mitigate inter-user blocking probability by randomizing the allocation of PDCCH candidates of a user within the CORESET over consecutive time slots.

In various embodiments, the first PDCCH configuration may include a first set of aggregation levels, and the second PDCCH configuration may include a second set of aggregation levels which may be different from the first set of aggregation levels. For example, one of the at least one PDCCH candidate and one of the at least one second PDCCH candidate with the same aggregation level of the same CORESET may be non-overlapping in time domain. Additionally or alternatively, one of the at least one PDCCH candidate may overlap at least partially in time domain with one of the at least one second PDCCH candidate with different aggregation levels of the same CORESET. Furthermore, at least one of the first PDCCH configuration or the second PDCCH configuration may be related to a single carrier waveform.

In several embodiments, the first CORESET and the second CORESET may fully overlap in frequency domain, partially overlap in frequency domain, or not overlap in frequency domain. Additionally or alternatively, at least one predefined time resource of the first or second CORESETs may be reserved for beam switching. Furthermore, at least one predefined time resource of the first or second CORESETs may be reserved between CCEs, at least one predefined time resource of the first or second CORESETs may reserve at least one CCE, or at least one or each CCE may cover at least one or all frequency domain resource elements of the associated CORESET. The UE may be configured to interpret precoder granularity as at least one CCE.

In step 703, the UE may detect at least one PDCCH according to the first PDCCH configuration. The UE may also detect at least one second PDCCH according to the received second PDCCH configuration. UE 620 may be configured with at least one search space mapped to at least one CORESET, and may monitor for PDCCH associated with different PDCCH aggregation levels only in the time domain. For example, each CCE may cover an entire frequency allocation of the associated CORESET, with an absence of FDM between multiple CCE within a single CORESET.

In various embodiments, FDM may be configured with multiple CORESETs, such as where NE 610 supports at least two digital transceiver units, with each transceiver being configured with a separate CORESET. As a result, the DMRS density may be optimized by be separated for various AL, as illustrated in FIG. 4. DMRS density may be described by a ratio of DMRS symbols to symbols including both DMRS symbols and DCI symbols. DMRS density may be high, e.g. 1:2, meaning that there is as many DMRS symbols as there is DCI symbols. DMRS density may also be lower, e.g. 1:3, 1:4, or 1:5, resulting in lower overhead due to DMRS. As an example, the first CORESET (CORESET #1) with a first DMRS density may be configured for use for serving at least one cell edge UE (AL=16). The first DMRS density may be high, e.g. 1:2 or 1:3 as shown in FIG. 4. In this case, a higher DMRS density in time domain may result in defining a CCE shorter than the CCE associated with the second CORESET and reduced PDCCH overhead (CORESET #2a, CORESET #2b). Another embodiment may include an equal number of PDCCH DCI symbols within each CCE, such as 3, and vary the number of DMRS symbols per CCE, such as between 1, 2, 3. The first CORESET may be used also for UEs with small AL (e.g. 1), such as for UE associated with propagation conditions exceeding a predefined threshold or based on at least one other selection metric defined by NE 610. A small number of DCI symbols may be enough for such UEs (e.g., due to use of relatively high code rate in the encoding of DCI bits). As a DMRS symbol may occupy a full symbol and only a small number of DCI symbols may be needed, the PDCCH candidate may have a high DMRS density as shown in FIG. 4 for CORESET #1 with AL=1 The second CORESET may be configured for serving UE with propagation conditions exceeding a second predefined threshold or based on at least one other selection metric defined by NE 610, for example, PDCCHs with aggregation level of 1, 2, 4, 8, or other values. The second CORESET may have a second DMRS density that may be lower than the first DMRS density, e.g. 1:4 (as for CORESET #2a and #2b) or 1:5.

In step 705, the UE may transmit and/or receive at least one signal according to the at least one detected first and/or second PDCCH.

Figure 8:
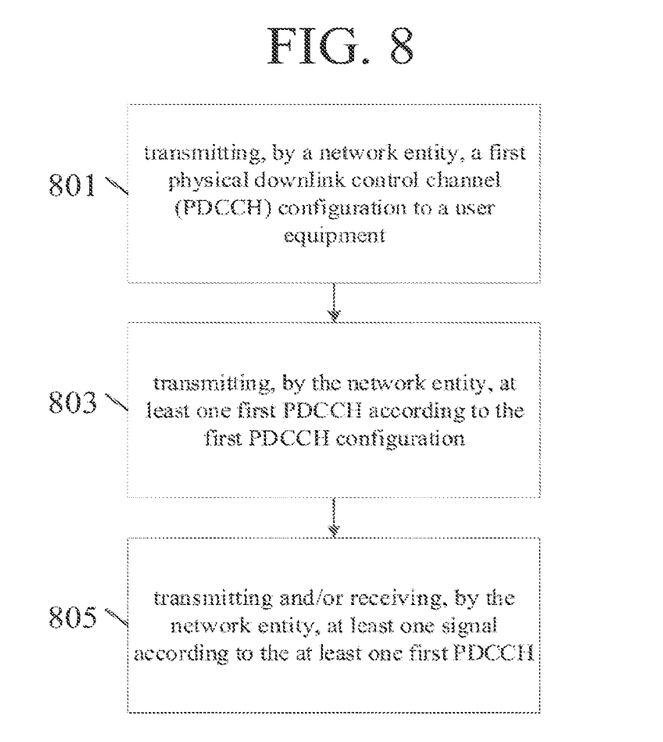
FIG. 8 illustrates an example of a method performed by a network entity according to certain embodiments.

FIG. 8 illustrates an example of a method performed by a network entity, such as network entity 810 illustrated in FIG. 9, according to certain embodiments. In step 801, the NE may transmit a first physical downlink control channel (PDCCH) configuration to a user equipment, such as UE 920 illustrated in FIG. 9. The first PDCCH configuration may comprise a first search space (SS) associated with a first control resource set (CORESET), and the first SS may comprise at least one PDCCH candidate. In this context, search space may also be referred to as search space set or other similar language. A set of PDCCH candidates for the UE to monitor on a CORESET may be defined in terms of a PDCCH search space. In various embodiments, the NE may also transmit a second PDCCH configuration having a search space associated with a second CORESET to the UE. The second PDCCH configuration may comprise a second SS associated with a second CORESET, and the second SS may comprise at least one second PDCCH candidate.

In some embodiments, the first SS may comprise at least one PDCCH candidate, where each of the at least one PDCCH candidate may comprise at least one control channel element (CCE) including at least one of at least one demodulation reference signal (DMRS) portion, or at least one downlink control information (DCI) portion. In certain embodiments, a CCE may comprise one or more REGs as building blocks, such as DMRS REG(s) and DCI REG(s). In addition, a CCE may comprise one or more REG bundles, for example, a CCE may correspond to an REG bundle.

As an example, at least one CCE in the first CORESET may be associated with a first DMRS density, and at least one CCE in the second CORESET may be associated with a second DMRS density, where the first and the second DMRS densities may be different or the same. In various embodiments, at least one PDCCH candidate of the UE may vary between consecutive monitoring occasions based upon at least one predefined hashing function. For example, hashing may be applied to mitigate inter-user blocking probability by randomizing the allocation of PDCCH candidates of a user within the CORESET over consecutive time slots.

In various embodiments, the first PDCCH configuration may include a first set of aggregation levels, and the second PDCCH configuration may include a second set of aggregation levels which may be different from the first set of aggregation levels. For example, one of the at least one PDCCH candidate and one of the at least one second PDCCH candidate with the same aggregation level of the same CORESET may be non-overlapping in time domain. Additionally or alternatively, one of the at least one PDCCH candidate may overlap at least partially in time domain with one of the at least one second PDCCH candidate with different aggregation levels of the same CORESET. Furthermore, at least one of the first PDCCH configuration or the second PDCCH configuration may be related to a single carrier waveform.

In several embodiments, the first CORESET and the second CORESET may fully overlap in frequency domain, partially overlap in frequency domain, or not overlap in frequency domain. Additionally or alternatively, at least one predefined time resource of the first or second CORESETs may be reserved for beam switching. Furthermore, at least one predefined time resource of the first or second CORESETs may be reserved between CCEs, at least one predefined time resource of the first or second CORESETs may reserve at least one CCE, or at least one or each CCE may cover at least one or all frequency domain resource elements of the associated CORESET.

In step 803, the NE may transmit at least one PDCCH according to the first PDCCH configuration. The NE may also may also detect at least one second PDCCH according to the received second PDCCH configuration. The UE may be configured with at least one search space mapped to at least one CORESET, and may monitor for PDCCH associated with different PDCCH aggregation levels only in the time domain. For example, each CCE may cover an entire frequency allocation of the associated CORESET, with an absence of FDM between multiple CCE within a single CORESET.

In various embodiments, FDM may be configured with multiple CORESETs, such as where the NE supports at least two digital transceiver units, with each transceiver being configured with a separate CORESET. As a result, the DMRS density may be optimized by be separated for various AL, as illustrated in FIG. 4. DMRS density may be described by a ratio of DMRS symbols to symbols including both DMRS symbols and DCI symbols. DMRS density may be high, e.g. 1:2, meaning that there is as many DMRS symbols as there is DCI symbols. DMRS density may also be lower, e.g. 1:3, 1:4, or 1:5, resulting in lower overhead due to DMRS. As an example, the first CORESET (CORESET #1) with a first DMRS density may be configured for use for serving at least one cell edge UE (AL=16). The first DMRS density may be high, e.g. 1:2 or 1:3 as shown in FIG. 4. In this case, a higher DMRS density in time domain may result in defining a CCE shorter than the CCE associated with the second CORESET and reduced PDCCH overhead (CORESET #2a, CORESET #2b). Another embodiment may include an equal number of PDCCH DCI symbols within each CCE, such as 3, and vary the number of DMRS symbols per CCE, such as between 1, 2, 3. The first CORESET may be used also for UEs with small AL (e.g. 1), such as for UE associated with propagation conditions exceeding a predefined threshold or based on at least one other selection metric defined by the NE. A small number of DCI symbols may be enough for such UEs (e.g., due to use of relatively high code rate in the encoding of DCI bits). As a DMRS symbol may occupy a full symbol and only a small number of DCI symbols may be needed, the PDCCH candidate may have a high DMRS density as shown in FIG. 4 for CORESET #1 with AL=1 The second CORESET may be configured for serving UE with propagation conditions exceeding a second predefined threshold or based on at least one other selection metric defined by the NE, for example, PDCCHs with aggregation level of 1, 2, 4, 8, or other values. The second CORESET may have a second DMRS density that may be lower than the first DMRS density, e.g. 1:4 (as for CORESET #2a and #2b) or 1:5.

In step 805, the NE may transmit and/or receive at least one signal according to the at least one detected first and/or second PDCCH.

FIG. 9 illustrates an example of a system according to certain embodiments. In one embodiment, a system may include multiple devices, such as, for example, network entity 910 and user equipment 920.

Network entity 910 may be one or more of a base station, such as an evolved node B (eNB) or next generation node B (gNB), a next generation radio access network (NG RAN), a serving gateway, a server, a relay node, such as a distributed unit part of an integrated access and backhaul (IAB) node, and/or any other access node or combination thereof.

User equipment 920 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, a relay node, such as a mobile termination part of an JAB node, or any combination thereof.

In some embodiments, network entity 910 and user equipment 920 may be a part of a relay node. Multiple relays may be chained together to form a multi-hop-relay network in a relay deployment. Furthermore, a citizens broadband radio service (CBRS) device (CBSD) may include one or more serving cells, such as network entity 910 and user equipment 920.

One or more of these devices may include at least one processor, respectively indicated as 911 and 921. At least one memory may be provided in one or more of devices indicated at 912 and 922. The memory may be fixed or removable. The memory may include computer program instructions or computer code contained therein. Processors 911 and 921 and memory 912 and 922 or a subset thereof, may be configured to provide means corresponding to the various blocks of FIGS. 1-8. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 9, transceivers 913 and 923 may be provided, and one or more devices may also include at least one antenna, respectively illustrated as 914 and 924. The device may have many antennas, such as an array of antennas configured for multiple input multiple output (MIMO) communications, or multiple antennas for multiple radio access technologies. Other configurations of these devices, for example, may be provided.

Transceivers 913 and 923 may be a transmitter, a receiver, or both a transmitter and a receiver, or a unit or device that may be configured both for transmission and reception.

Processors 911 and 921 may be embodied by any computational or data processing device, such as a central processing unit (CPU), application specific integrated circuit (ASIC), or comparable device. The processors may be implemented as a single controller, or a plurality of controllers or processors.

Memory 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-8). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-8. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

| Partial Glossary | |
|---|---|
| 3GPP | 3rd Generation Partnership Project |
| AL | Aggregation Level |
| CCE | Control Channel Element |
| CORESET | Control Resource Set |
| CP-OFDM | Cyclic Prefix Orthogonal Frequency Division Multiplex |
| DCI | Downlink Control Information |
| DFT | Discrete Fourier Transformation |
| DFT-S-OFDM | Discrete Fourier Transformation Spread Orthogonal Frequency Division Multiplex |
| DL | Downlink |
| DMRS | Demodulation Reference Signal |
| FDM | Frequency Division Multiplex |
| FFT | Fast Fourier Transform |
| eMBB | Enhanced Mobile Broadband |
| eNB | Evolved Node B |
| EPC | Evolved Packet Core |
| gNB | Next Generation eNB |
| GPS | Global Positioning System |
| GS | Ground Station |
| IFFT | Inverse Fast Fourier Transformation |
| LTE | Long-Term Evolution |
| MCS | Modulation and Coding Scheme |
| MIMO | Multiple Input Multiple Output |
| MME | Mobility Management Entity |
| MTC | Machine-Type Communications |
| NR | New Radio |
| OFDM | Orthogonal Frequency Division Multiplex |
| PA | Power Amplifier |
| PAPR | Peak-to-Average Power Ratio |
| RAN | Radio Access Network |
| RSRP | Reference Signal Received Power |
| SFN | System Frame Number |
| SFTD | System Frame Timing Difference |
| SSB | Synchronization Signal Block |
| SS | Search Space |
| TA | Timing Advance |
| TATD | Timing Advance Timing Difference |
| UE | User Equipment |
| UL | Uplink |
| URLLC | Ultra-Reliable and Low-Latency Communication |
| WLAN | Wireless Local Area Network |

According to a first embodiment, a method may include receiving, by a user equipment, a first physical downlink control channel (PDCCH) configuration from a network entity. The method may further include detecting, by the user equipment, at least one PDCCH according to the first PDCCH configuration. The method may further include transmitting and/or receiving, by the user equipment, at least one signal according to the at least one detected PDCCH.

In a variant, the first PDCCH configuration may comprise a first search space (SS) associated with a first control resource set (CORESET).

In a further variant, the first SS may comprise at least one PDCCH candidate.

In a further variant, each of the at least one PDCCH candidate may comprise at least one control channel element (CCE) including at least one of at least one demodulation reference signal (DMRS) portion, or at least one first downlink control information (DCI) portion.

In a further variant, the at least one CCE may comprise a time division multiplexing relation with at least another CCE.

In a variant, the method may further include receiving, by the user equipment, a second PDCCH configuration from the network entity.

In a variant, the second PDCCH configuration may comprise a search space associated with a second CORESET from the network entity.

In a further variant, the method may further include detecting, by the user equipment, at least one second PDCCH according to the received second PDCCH configuration.

In a variant, the second PDCCH configuration may comprise a second SS associated with a second CORESET.

In a further variant, the second SS may comprise at least one second PDCCH candidate.

In a further variant, each of the at least one second PDCCH candidate may comprise at least one CCE including at least one of at least one DMRS portion, or at least one DCI portion.

In a further variant, the at least one CCE may be at least one second CCE.

In a further variant, the at least one DMRS portion may be at least one second DMRS portion.

In a further variant, the at least one DCI portion may be at least one second DCI portion.

In a further variant, the at least one CCE of the at least one PDCCH candidate may comprise a time division multiplexing relation with at least one CCE of the at least one second PDCCH candidate.

In a variant, one of the at least one PDCCH candidate and one of the at least one second PDCCH candidate with the same aggregation level of the same CORESET may be non-overlapping in time domain.

In a variant, one of the at least one PDCCH candidate may overlap at least partially in time domain with one of the at least one second PDCCH candidate with different aggregation levels of the same CORESET.

In a variant, at least one of the first PDCCH configuration or the second PDCCH configuration may be related to a single carrier waveform.

In a variant, at least one CCE in the first CORESET may be associated with a first DMRS density, and at least one CCE in the second CORESET may be associated with a second DMRS density.

In a variant, the first and the second DMRS densities may be different or the same.

In a variant, the first PDCCH configuration may include a first set of aggregation levels, and the second PDCCH configuration may include a second set of aggregation levels which may be different from the first set of aggregation levels.

In a variant, the first CORESET and the second CORESET may fully overlap in frequency domain, partially overlap in frequency domain, or not overlap in frequency domain.

In a variant, the first CORESET and the second CORESET may be associated with different transceivers and/or different transmit beams at a base station.

In a variant, at least one predefined time resource of the first or second CORESETs may be reserved for beam switching.

In a variant, at least one predefined time resource of the first or second CORESETs may be reserved between CCEs.

In a variant, at least one predefined time resource of the first or second CORESETs may reserve at least one CCE.

In a variant, at least one or each CCE may cover at least one or all frequency domain resource elements of the associated CORESET.

In a variant, the user equipment may be configured to interpret precoder granularity as CCE.

In a variant, at least one PDCCH candidate of the UE may vary between consecutive monitoring occasions based on a predefined hashing function.

According to a second embodiment, a method may include transmitting, by a network entity, a first physical downlink control channel (PDCCH) configuration to a user equipment. The method may further include transmitting, by the network entity, at least one first PDCCH according to the first PDCCH configuration to the user equipment. The method may further include transmitting and/or receiving, by the network entity, at least one signal according to the at least one first PDCCH.

In a variant, the first PDCCH configuration may comprise a first search space (SS) associated with a first control resource set (CORESET).

In a further variant, the first SS may comprise at least one PDCCH candidate.

In a further variant, each of the at least one PDCCH candidate may comprise at least one control channel element (CCE) including at least one of at least one demodulation reference signal (DMRS) portion, or at least one first downlink control information (DCI) portion.

In a further variant, the at least one CCE may comprise a time division multiplexing relation with at least another CCE.

In a variant, the method may further include transmitting, by the network entity, a second PDCCH configuration.

In a variant, the second PDCCH configuration may comprise a search space associated with a second CORESET to the user equipment.

In a variant, the second PDCCH configuration may comprise a second SS associated with a second CORESET.

In a further variant, the second SS may comprise at least one second PDCCH candidate.

In a further variant, each of the at least one second PDCCH candidate may comprise at least one second CCE including at least one of at least one DMRS portion, or at least one DCI portion.

In a variant, the at least one DMRS portion may be at least one second DMRS portion. The at least one DCI portion may be at least one second DCI portion.

In a further variant, the at least one second DCI portion may comprise a second time division multiplexing relation with at least one second DCI portion.

In a variant, one of the at least one PDCCH candidate and one of the at least one second PDCCH candidate with the same aggregation level of the same CORESET may be non-overlapping in time domain.

In a variant, one of the at least one PDCCH candidate may overlap at least partially in time domain with one of the at least one second PDCCH candidate with different aggregation levels of the same CORESET.

In a variant, at least one of the first PDCCH configuration or the second PDCCH configuration may be related to a single carrier waveform.

In a variant, at least one CCE in the first CORESET may be associated with a first DMRS density, and at least one CCE in the second CORESET may be associated with a second DMRS density.

In a variant, the first and the second DMRS densities may be different or the same.

In a variant, the first PDCCH configuration may include a first set of aggregation levels, and the second PDCCH configuration may include a second set of aggregation levels which may be different from the first set of aggregation levels.

In a variant, the first CORESET and the second CORESET may fully overlap in frequency domain, partially overlap in frequency domain, or not overlap in frequency domain.

In a variant, the first CORESET and the second CORESET may be associated with different transceivers and/or different transmit beams at a base station.

In a variant, at least one predefined time resource of the first or second CORESETs may be reserved for beam switching.

In a variant, at least one predefined time resource of the first or second CORESETs may be reserved between CCEs.

In a variant, at least one predefined time resource of the first or second CORESETs may reserve at least one CCE.

In a variant, at least one or each CCE may cover at least one or all frequency domain resource elements of the associated CORESET.

In a variant, the user equipment may be configured to interpret precoder granularity as CCE.

In a variant, at least one PDCCH candidate of the UE may vary between consecutive monitoring occasions based on a predefined hashing function.

According to a third embodiment and a fourth embodiment, an apparatus can include at least one processor and at least one memory and computer program code. The at least one memory and the computer program code can be configured to, with the at least one processor, cause the apparatus at least to perform a method according to the first embodiment, the second embodiment, and any of their variants.

According to a fifth embodiment and a sixth embodiment, an apparatus can include means for performing the method according to the first embodiment, the second embodiment, and any of their variants.

According to a seventh embodiment and an eighth embodiment, a computer program product may encode instructions for performing a process including a method according to the first embodiment, the second embodiment, and any of their variants.

According to a ninth embodiment and a tenth embodiment, a non-transitory computer-readable medium may encode instructions that, when executed in hardware, perform a process including a method according to the first embodiment, the second embodiment, and any of their variants.

According to an eleventh embodiment and a twelfth embodiment, a computer program code may include instructions for performing a method according to the first embodiment, the second embodiment, and any of their variants.

According to a thirteenth embodiment and a fourteenth embodiment, an apparatus may include circuitry configured to perform a process including a method according to the first embodiment, the second embodiment, and any of their variants.

What is claimed is:

1. An apparatus comprising:
   at least one processor, and
   at least one memory and computer program code,
   the at least one memory and the computer program code are configured to, with the at least one processor, cause the apparatus at least to
   receive a first physical downlink control channel configuration from a network entity,
      wherein:
      the first physical downlink control channel configuration comprises a first search space associated with a first control resource set, and
      the first search space comprises at least one physical downlink control channel candidate;
   receive a second physical downlink control channel configuration from the network entity,
      wherein:
      the second physical downlink control channel configuration comprises a second search space associated with a second control resource set, and
      the second search space comprises at least one second physical downlink control channel candidate, and
      wherein one of the at least one physical downlink control channel candidate overlaps at least partially in time domain with one of the at least one second physical downlink control channel candidate with different aggregation levels of same control resource set;
   detect at least one physical downlink control channel based on the first physical downlink control channel configuration and the second physical downlink control channel configuration; and
   transmit and/or receive at least one signal based on the at least one detected physical downlink control channel.

2. The apparatus of claim 1, wherein at least one control channel element in the first control resource set is associated with a first demodulation reference signal density, and at least one control channel element in the second control resource set is associated with a second demodulation reference signal density.

3. The apparatus of claim 1, wherein the first physical downlink control channel configuration includes a first set of aggregation levels, and the second physical downlink control channel configuration includes a second set of aggregation levels different from the first set of aggregation levels.

4. The apparatus of claim 1, wherein each of the at least one second physical downlink control channel candidate comprises at least one control channel element including at least one of: at least one demodulation reference signal portion, or at least one downlink control information portion.

5. The apparatus of claim 4, wherein at least one control channel element of the at least one physical downlink control channel candidate comprises a time division multiplexing relation with the at least one control channel element of the at least one second physical downlink control channel candidate.

6. The apparatus of claim 1, wherein one of the at least one physical downlink control channel candidate and one of the at least one second physical downlink control channel candidate with same aggregation level of same control resource set are non-overlapping in time domain.

7. An apparatus comprising:
   at least at least one processor, and
   at least one memory and computer program code,
   the at least one memory and the computer program code are configured to, with the at least one processor, cause the apparatus at least to
   transmit a first physical downlink control channel configuration and a second physical downlink control channel configuration to a user equipment,
   wherein:
   the first physical downlink control channel configuration comprises a first search space associated with a first control resource set,
   the first search space comprises at least one physical downlink control channel candidate,
   the second physical downlink control channel configuration comprises a second search space associated with a second control resource set, and
   the second search space comprises at least one second physical downlink control channel candidate, and wherein one of the at least one physical downlink control channel candidate overlaps at least partially in time domain with one of the at least one second physical downlink control channel candidate with different aggregation levels of same control resource set;

transmit at least one first physical downlink control channel based on the first physical downlink control channel configuration and at least second physical downlink control channel based on the second physical downlink control channel configuration to the user equipment; and transmit and/or receive at least one signal based on the at least one first physical downlink control channel and the at least second physical downlink control channel.

8. A method, comprising:

receiving, at a user equipment, a first physical downlink control channel configuration, and a second physical downlink control channel configuration from a network entity, wherein:

the first physical downlink control channel configuration comprises a first search space associated with a first control resource set, the first search space comprises at least one physical downlink control channel candidate, the second physical downlink control channel configuration comprises a second search space associated with a second control resource set, and the second search space comprises at least one second physical downlink control channel candidate, and wherein one of the at least one physical downlink control channel candidate overlaps at least partially in time domain with one of the at least one second physical downlink control channel candidate with different aggregation levels of same control resource set;

detecting, at the user equipment, at least one physical downlink control channel based on the first physical downlink control channel configuration and the second physical downlink control channel configuration; and transmitting and/or receiving, by the user equipment, at least one signal based on the at least one detected physical downlink control channel.

* * * * *